United States Patent [19]
Vogler

[11] Patent Number: 5,815,683
[45] Date of Patent: Sep. 29, 1998

[54] ACCESSING A REMOTE CAD TOOL SERVER

[75] Inventor: Joe E. Vogler, Salem, Oreg.

[73] Assignee: Mentor Graphics Corporation, Wilsonville, Oreg.

[21] Appl. No.: 740,968

[22] Filed: Nov. 5, 1996

[51] Int. Cl.[6] .................................................. G06F 13/00
[52] U.S. Cl. ................ 395/500; 395/200.47; 395/200.55
[58] Field of Search ............................. 395/500, 200.47, 395/200.48, 200.49, 200.54, 200.55

[56] References Cited

U.S. PATENT DOCUMENTS

| | | | |
|---|---|---|---|
| 5,237,614 | 8/1993 | Weiss | 380/23 |
| 5,321,841 | 6/1994 | East et al. | 395/725 |
| 5,649,009 | 7/1997 | Theimer et al. | 395/187.01 |

OTHER PUBLICATIONS

"Providing access to a multimedia archive using the World Wide Web . . . " Dunlop et al. Computing & Control Engineering Oct. 1996, pp. 221–226.

"Manuf. Collaboration Resource Discovery Ststem" Virdhagriswaran et al., 1995 IEEE pp. 117–126.

"Secure Access to Data Over the Internet" Bina et al., 1994 IEEE, pp. 99–102.

"The CAR System:" Handley, 1993 Colleg. No. 26, pp. 8/1–8/5.

"A Shared Web to Support Design Teams" Kumar et al., IEEE 1994 pp. 178–182.

*Primary Examiner*—Kevin J. Teska
*Assistant Examiner*—A. S. Roberts
*Attorney, Agent, or Firm*—Blakely Sokoloff Taylor & Zafman, LLP

[57] ABSTRACT

An access facilitator is programmed to provide access service for facilitating remote client access to computer-aided design (CAD) tools. The access service includes services for accepting an access connection from a client, obtaining an internetworking address of the client, receiving an access request from the client, and routing the access request including the internetworking address to a CAD tool, resulting in the CAD tool directly responding to the client.

17 Claims, 7 Drawing Sheets

5,815,683

ACCESSING A REMOTE CAD TOOL SERVER

BACKGROUND OF THE INVENTION

FIELD OF THE INVENTION

The present invention relates to the art of Computer Aided Design (CAD) tools. More specifically, the present invention relates to the art of accessing CAD tools remotely.

BACKGROUND OF THE INVENTION

CAD tools have become indispensable in the design of modern complex integrated circuits. Examples of CAD tools include but not limited to QuickHDL and AutoLogic HDL, developed and marketed by Mentor Graphics Corporation of Wilsonville, Oreg. While many conventional CAD tools are designed to operate in a client/server model, most of these CAD tools are designed to operate in a local area network (LAN) environment only. In order to access these CAD tools remotely, remote access communication software must be employed to emulate the local presence of the remote client. Beside the disadvantage of having to require remote access communication software, the prior art approach also has the disadvantage of requiring the user to be knowledgeable of the operating environment of the CAD tools. Additionally, the prior art approaches either do not provide data integrity assurance, thereby requiring close coordinations among the users, or require elaborate system administration to ensure data integrity. For the purpose of this invention, ensuring data integrity means properly synchronizing read and write operations by multiple concurrent users of the CAD tools. Thus, it is desirable to have an improved approach to remotely accessing CAD tools.

SUMMARY OF THE INVENTION

An access facilitator is programmed to provide access service for facilitating remote client access to computer-aided design (CAD) tools. The access service includes services for accepting an access connection from a client, obtaining an internetworking address of the client, receiving access requests from the client, and routing the access requests including the internetworking address to a CAD tool on a CAD tool server, resulting in the CAD tool directly responding to the client.

In one embodiment, the access facilitator is further equipped with a hypertext transfer protocol (http) server, an access facilitator home page, and an access connect applet for facilitating connection of the client to the access facilitator.

In one embodiment, the access requests include access requests that result in design data being directly responded to the client, as well as access requests that result in new design data being created or existing design data being modified on the CAD tool server. The access service includes monitor service for monitoring the client's access requests, and routes the access requests in a read/write synchronized manner to ensure design data integrity.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as objects, data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order of presentation.

Figure 1:
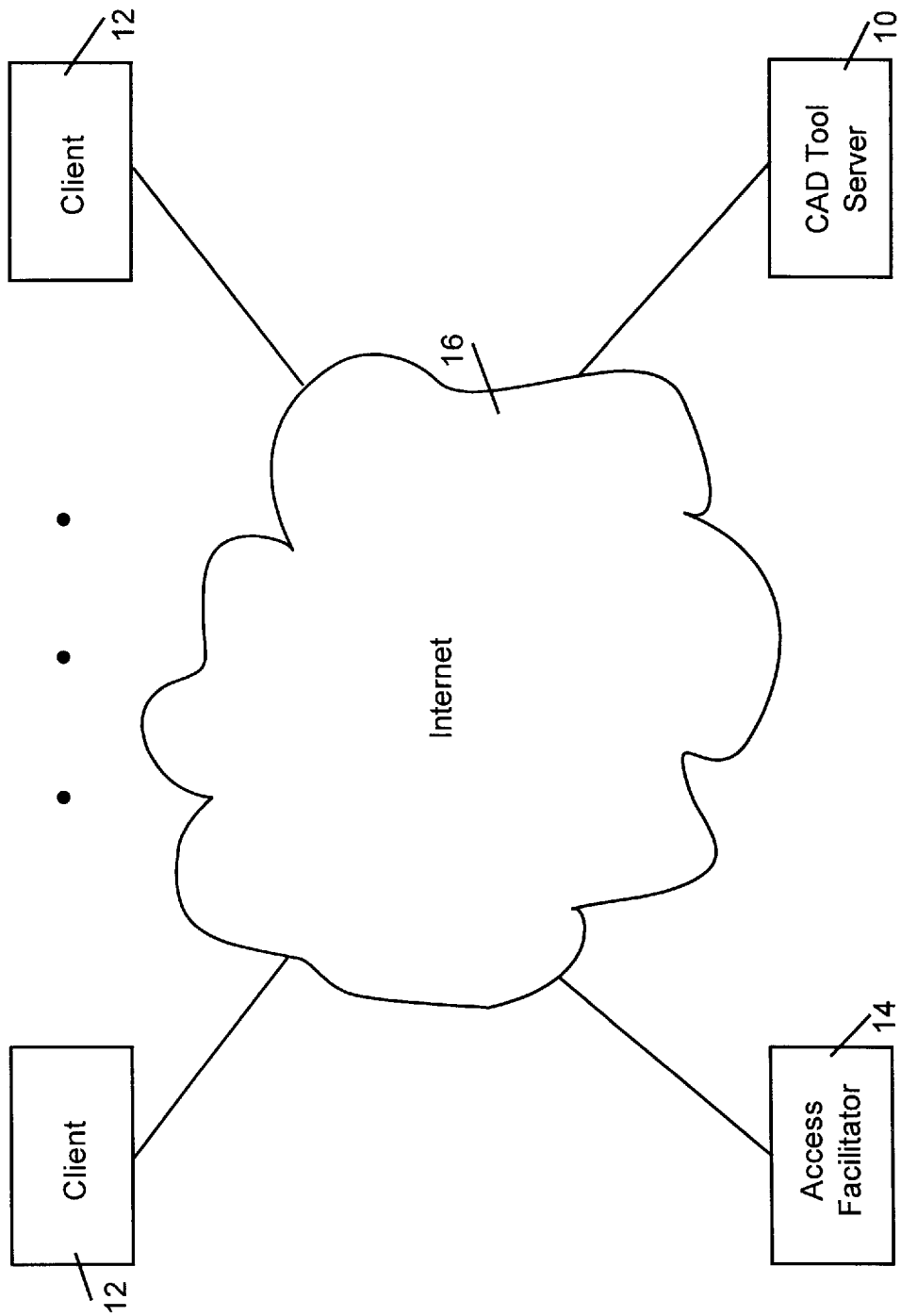
FIG. 1 is a block diagram illustrating the networking topology of a CAD tool server, a plurality of clients, and an access facilitator facilitating the clients' accesses to the CAD tool server in accordance with the present invention.

Referring now to FIG. 1, wherein a block diagram illustrating the networking topology of a CAD tool server, a plurality of clients, and an access facilitator facilitating the clients' access to the CAD tool server in accordance with the present invention is shown. For the illustrated embodiment, CAD tool server 10, clients 12, and access facilitator 14 are coupled to each other through Internet 16. Typically, though not necessarily, CAD tool server 10, clients 12, and access facilitator 14 are coupled to Internet 16 via Point of Presence providers; however, for ease of illustration, they are not shown. Additionally, CAD tool server 10 may also be coupled to access facilitator 14 via a local area network (LAN), and Internet 16 may be an organization's intranet. Alternatively, CAD tool server 10 and access facilitator 14 may reside on the same hardware.

Figure 2:
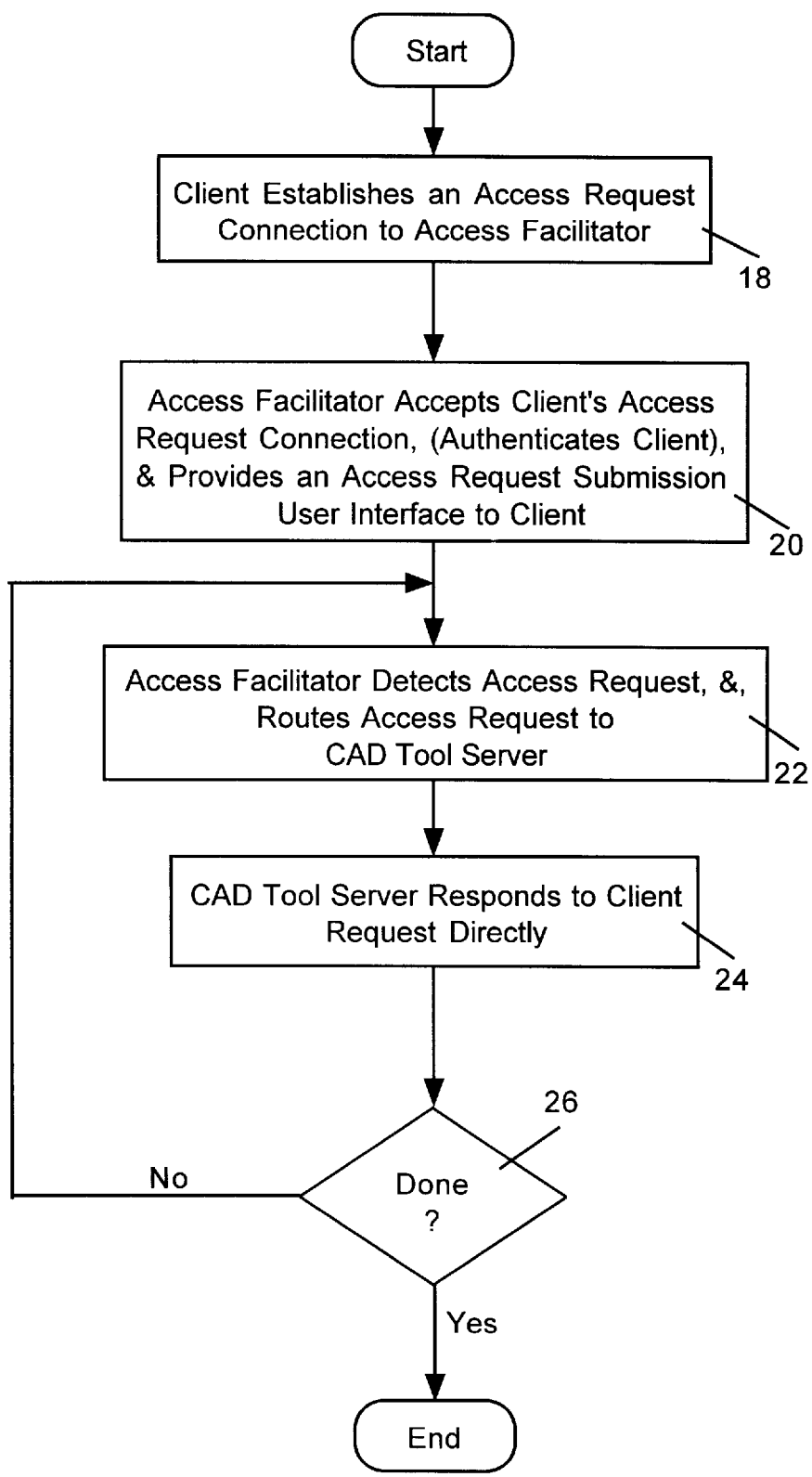
FIG. 2 is a flow diagram illustrating the method steps of the present invention practiced by the clients, the access facilitator, and the CAD tool server.

Referring now to FIG. 2, wherein a flow diagram illustrating the method steps of the present invention practiced by clients 12, access facilitator 14, and CAD tool server 16 is shown. For the illustrated embodiment, the substantive steps of the process of accessing CAD tool server 10 by a client 12 starts with the client 12 establishing an access connection to access facilitator 14, step 18. Upon accepting the client's access connection, access facilitator 14 obtains the internetworking address of client 12 and provides client 12 with an interface to submit access requests, step 20. For each access request received, access facilitator 14 routes the access request including client's internetworking address to CAD tool server 10, step 22. CAD tool server 10 services the request and responds to client 12 directly, using the internetworking address provided, step 24. Steps 22 and 24 are repeated until client 12 terminates the access process.

As will be described in more detail below, in one embodiment, the method steps of the present invention further include preparatory steps wherein client 12 establishes a web connection to a website serviced by access facilitator 14. Upon connection, access facilitator 14 provides a hypertext mark-up language (html) home page to client 12. The home page includes a selection whereby client 12 may initiate the process of the accessing CAD tool server 10. For this embodiment, in response to the client's selection to initiate the access process, access facilitator 14 provides an access connect applet to client 12 for establishing the above described access connection. In one embodiment, the identification of access facilitator 14 and the port number for establishing the access connection are entered by a user of client 12. In alternate embodiments, the information may be hard coded or supplied in a number of alternate manners. Access connect applet may also facilitate collection of various client information, such as user identification for authentication. The type and extent of client information collected are application dependent.

For this embodiment, the access connection is established upon authentication of the client information. In one embodiment, the interface provided by access facilitator 14 for submitting access requests is a command line interface including a plurality of supported commands, e.g. Compile, Simulate, etc. In alternate embodiments, a graphical user interface may be provided. Access facilitator 14 further includes an access monitor for monitoring access requests submitted by client 12. Client's access requests may result in design data being returned to client 12 as well as either new design data being created on CAD tool server 10 or existing design data on CAD server 10 being modified. The access monitor detects and routes the access requests in a read/write synchronized manner to ensure design data integrity. In other words, only one "read" or "write" operation is requested of CAD tool server 10 at any point in time.

Figure 3:
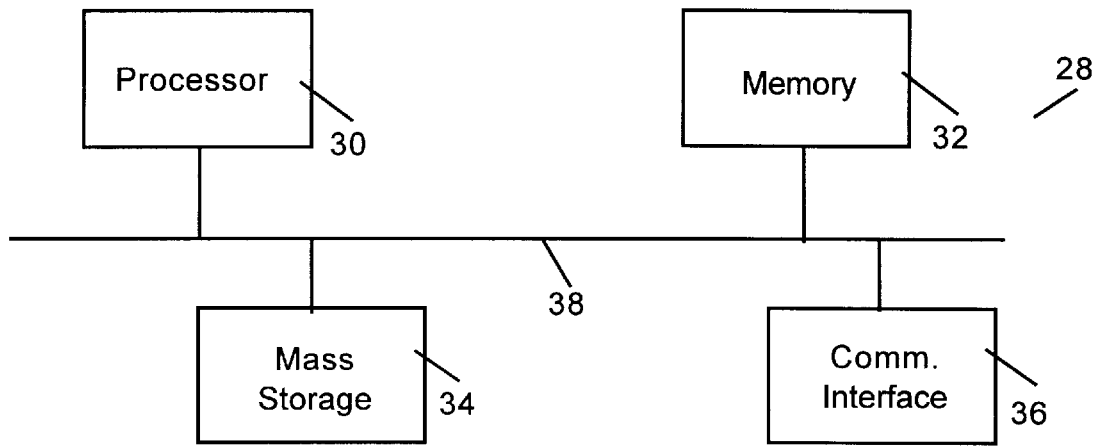
FIG. 3 is a block diagram illustrating an exemplary computer system suitable for the role of the client, the access facilitator, as well as the CAD tool server.

Referring now to FIG. 3, wherein a block diagram illustrating an exemplary computer system suitable for use as CAD tool server 10, client 12, as well as access facilitator 14 is shown. Exemplary computer system 28 includes processor 30, memory 32, mass storage 34, and communication interface 36 coupled to each other via system bus 38. Each of these elements 30–38 performs its conventional functions known in the art. In particular, processor 30 is used to execute programming instructions, while memory 32 and mass storage 34 are used to store temporary and permanent copies of the programming instructions being executed. The constitutions of these elements 30–38 are known in the art. In fact, exemplary computer system 28 is intended to represent a broad category of special or general purpose computer systems known in the art. Obviously, processor of different operating speeds, memory and mass storage of different sizes are employed, depending on whether exemplary computer system 28 is used as CAD tool server 10, client 12 or access facilitator 14.

Figure 4:
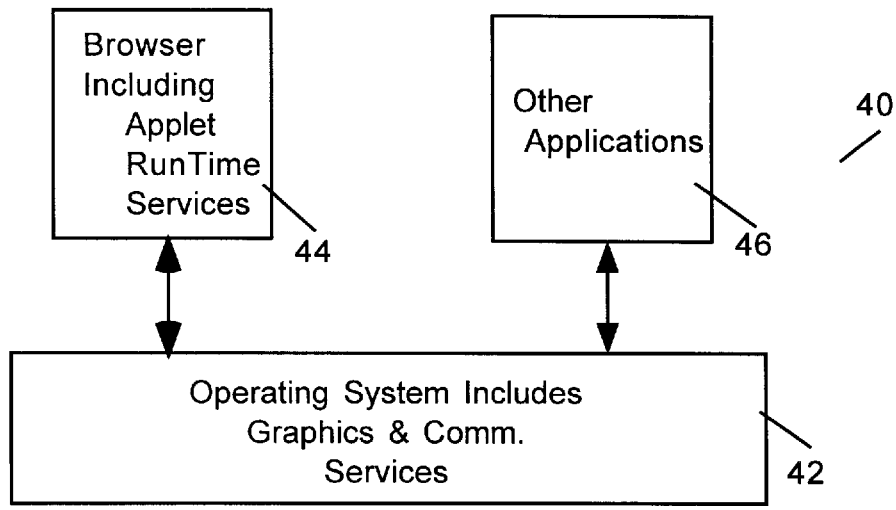
FIGS. 4–6 are block diagrams illustrating one embodiment each of the software environment of the client, the access facilitator, and the CAD tool server.
Figure 5:
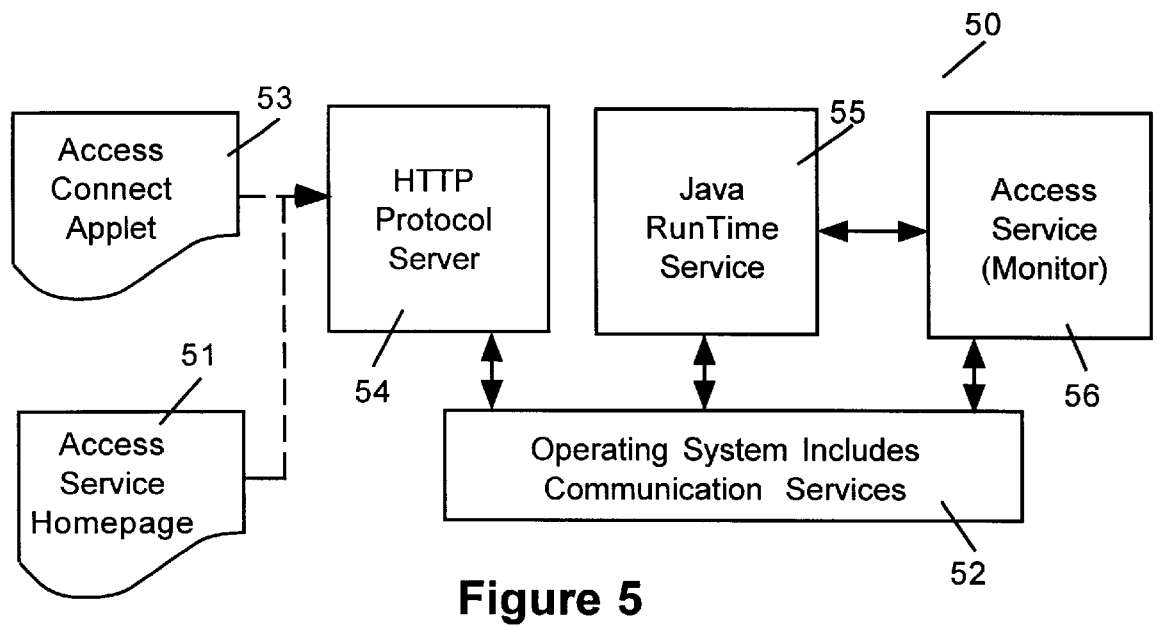
Figure 6:
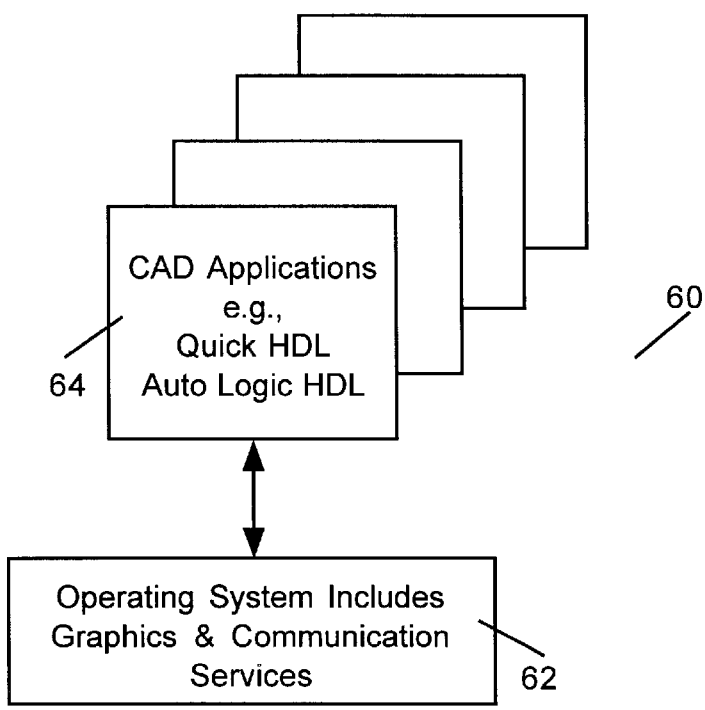

Referring now to FIGS. 4–6, wherein three block diagrams illustrating one embodiment each of the software environment of a client 12, access facilitator 14, and CAD tool server 10 are shown. For the illustrated embodiment, software environment 40 of client 12 (FIG. 4) includes operating system 42, browser 44 and other applications 46. Operating system 42 includes graphics, interprocess communication, as well as networking communication services, including in particular Transmission Control Protocol (TCP) and Internet Protocol (IP) communication services. A particular example of operating system 42 is Windows 95™ of Microsoft Corp. of Redmond, Wash., extended with an xterm emulator. Browser 44 include applet runtime services. A particular example of browser 44 is Navigator v3 or later, equipped with JAVA runtime services.

For the illustrated embodiment, software environment 50 of access facilitator 14 (FIG. 5) includes operating system 52, http server 54 and access service 56. Operating system 52 also includes graphics, interprocess communication, as well as network communication services, including in TCP/IP communication services. A particular example of operating system 52 is Windows NT™ of Microsoft Corp. of Redmond, Wash. Http-server 54 is known in the art. Http server 54 has access in particular to access control homepage 51, which includes a selection for a user of client 12 to initiate the access process. Http server 54 also has access to access connect applet 53 to be provided to client 12 in response to client 12 initiating the access process. Access service 56 including its monitor service will be described in further detail below.

For the illustrated embodiment, software environment 60 of CAD tool server 10 (FIG. 6) includes operating system 62, and CAD tools 64. Operating system 62 also includes graphics, interprocess communications, as well as network communication services, including in TCP/IP communication services. A particular example of operating system 62 is UNIX™ of Santa Cruz Operation of Santa Cruz, Calif. Particular examples of CAD tools 64 are QuickHDL and AutoLogic HDL of Mentor Graphics Corp. of Wilsonville, Oreg.

Figure 7:
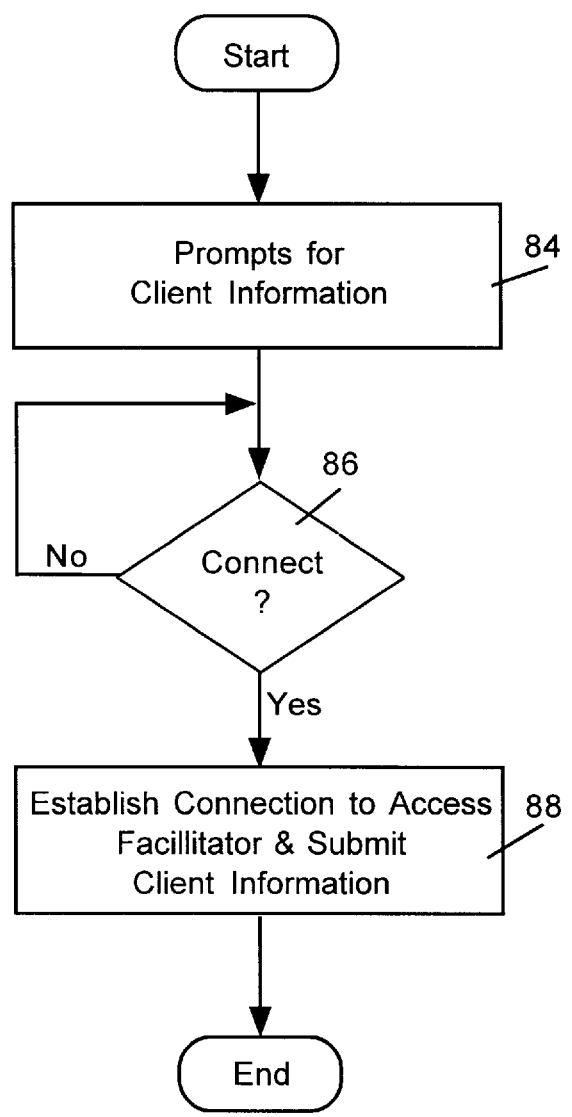
FIG. 7 is a flow diagram illustrating one embodiment of the operational flow of access connect applet.

Referring now to FIG. 7, wherein a block diagram illustrating one embodiment of the operational steps of access connect applet 53 is shown. As illustrated, access connect applet 53 prompts client 12 for client information, step 84. In one embodiment, the prompting is accomplished through a pop-up window. In some embodiments, the prompting further includes prompting for access facilitator's identification, and a connection port of access facilitator 14. In other embodiments, these information are hard coded. Upon prompting, access connect applet 53 waits for the prompted information to be entered and an indication from the user to submit the entered information, step 86. Upon receiving the indication to submit the client information (e.g. the user clicking a "submit" button), access connect applet 53 establishes an access connection to access facilitator 14, and submits the entered information to access service 56, step 88.

Figure 8:
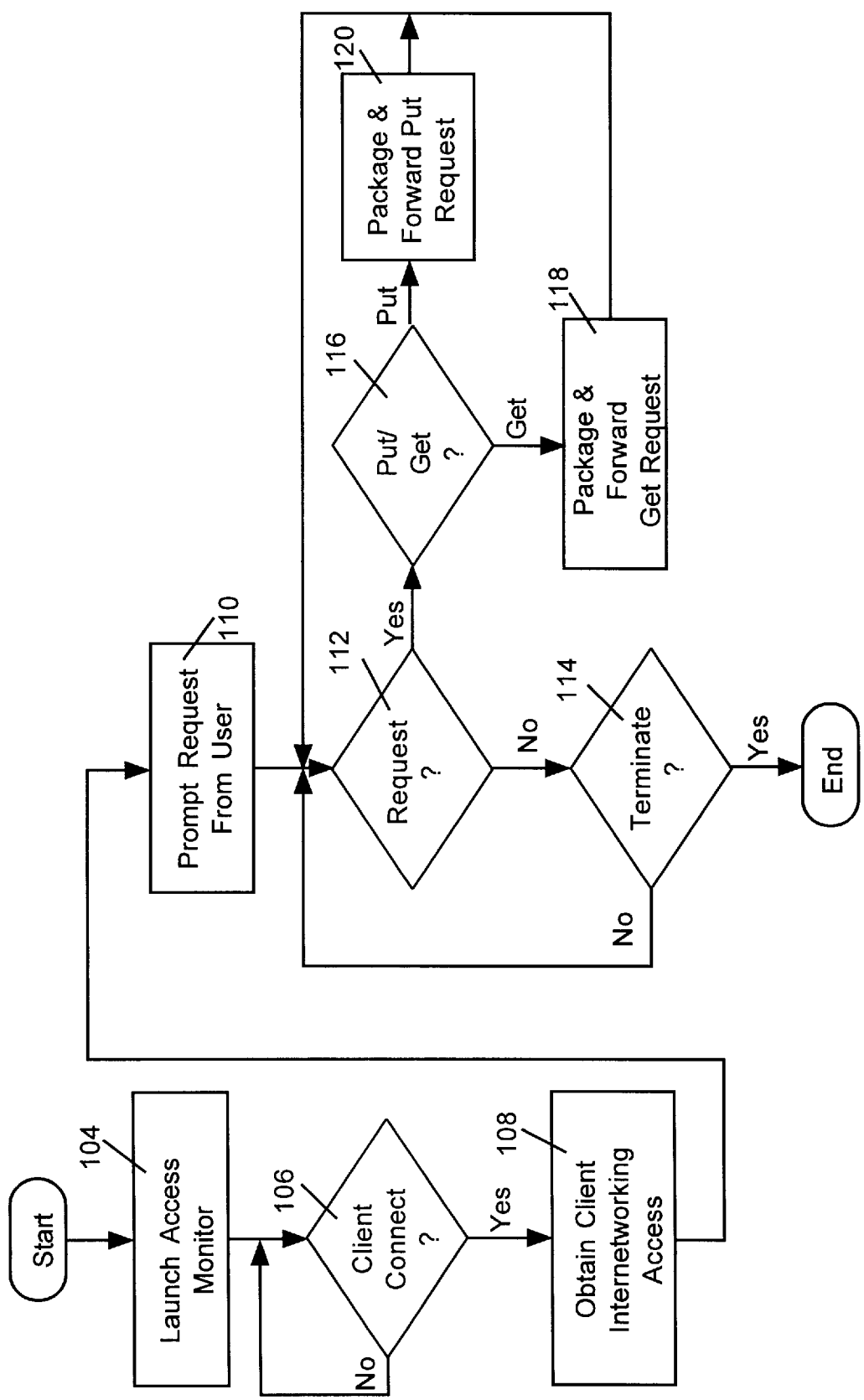
FIGS. 8–9 are flow diagrams illustrating one embodiment of the operating flow of access service, including access monitor.
Figure 9:
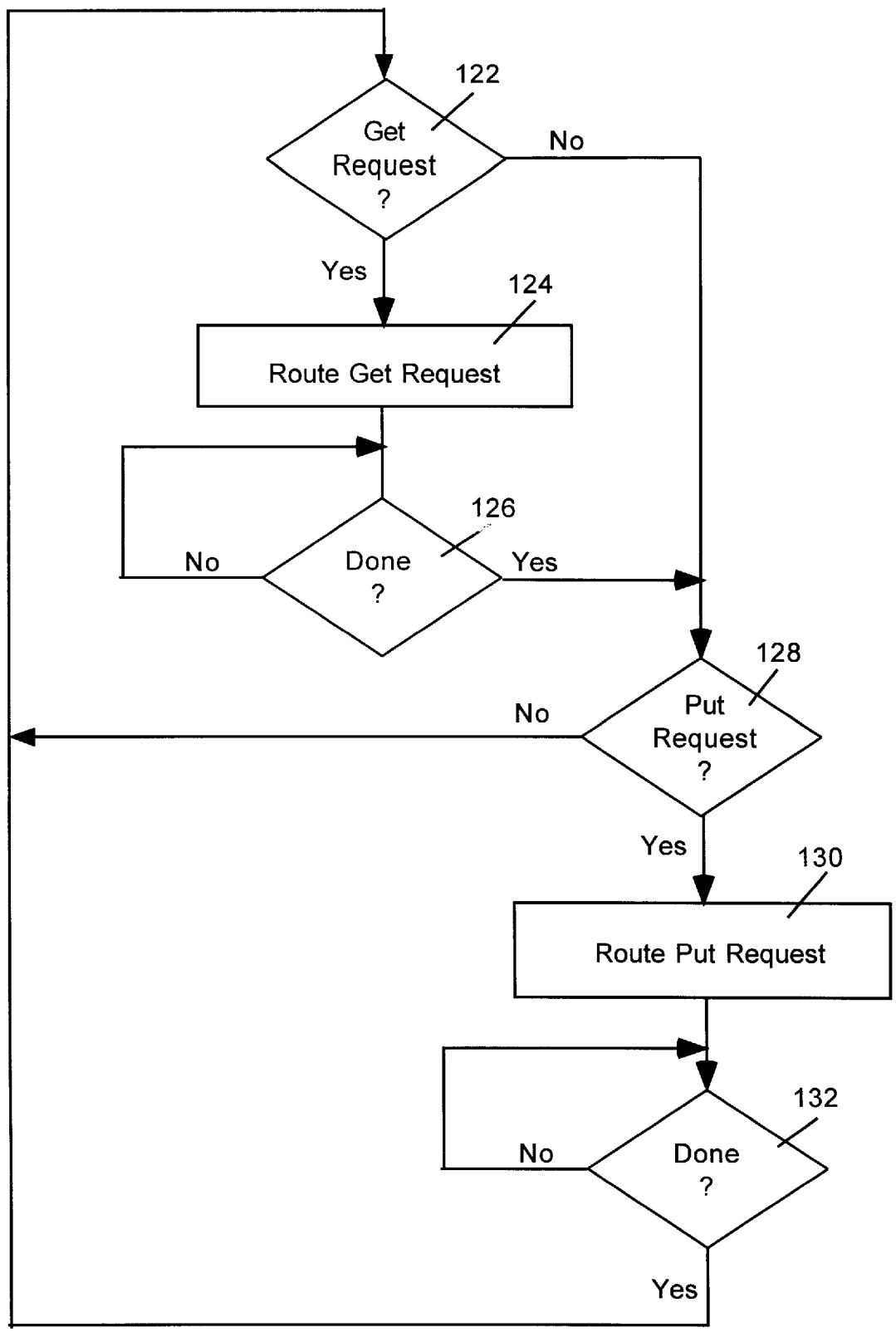

Referring now to FIGS. 8–9, wherein two block diagram illustrating the operating steps of access service 56, including the operating steps of an associated monitor service, is shown. As illustrated in FIG. 8, at start up (e.g. during initialization of access facilitator 14), access service 56 launches access monitor, step 104. Access service 56 then waits for client 12 to establish an access connection, step 106. Upon accepting the access connection attempted by client 12, access service 56 obtain the internetworking address of client 12, step 108, and proceeds to step 110. In an alternate embodiment, prior to proceeding to step 110, access service 56 also authenticates client 12. If client 12 fails the authentication process, the access process is terminated. Access service 56 proceeds with the access process only if client 12 is successfully authenticated. Authentication may be performed in any one of a number of conventional approaches known in the art.

Starting at step 110, access service 56 presents client 12 with an interface for submitting access requests. As described earlier, in one embodiment, the interface provided is a command line interface including a plurality of supported commands, e.g. Compile, Simulate, etc. In alternate embodiments, graphical user interface may be provided. Upon presenting the interface, access service 56 waits for access requests from clients 12, and packages the access requests accordingly, depending on whether the access request is a "get" or a "put" access request, steps 116–120. A "get" access request is an access request that results in design data being retrieved on behalf of client 12, in other words, a "read" access request. On the other hand, a "put" access request is an access request that results in either new design data being created on CAD tool server 10 or existing design data on CAD tool server 10 being modified on behalf of client 12, in other words, a "write" access request. The process continues until access service 56 receives an indication from client 12 to terminate the access process, step 114.

As illustrated in FIG. 9, upon being launched, access monitor monitors for client access requests continually. At step 122, access monitor determines if client 12 has submitted a "get" request". If so, access monitor routes the "get" request including client's internetworking address to CAD tool server 10 for execution, step 124. CAD tool server 10 then retrieves the design data on behalf of client 12. Upon routing the "get" request to CAD tool server 10, access monitor waits for routed "get" request to complete before checking for "put" requests, step 126. If no "get" request was detected at step 122 or at the completion of a "get" request by CAD tool server 10, access monitor determines if client 12 has submitted a "put" request", step 128. If so, access monitor routes the "put" request including client's internetworking address to CAD tool server 10 for execution, step 130. CAD tool server 10 then creates/modifies design data on behalf of client 12. Upon routing the "put" request to CAD tool server 10, access monitor waits for routed "put" request to complete before checking for "get" requests again, step 132. If no "put" request was detected at step 128 or at the completion of a "put" request by CAD tool server 10, access monitor returns to step 122 as described earlier. In other words, client's access requests are routed to CAD tool server 10 for execution in a read/write synchronized manner, resulting in only either a "get" or a "put" request being serviced by CAD tool server 10 at any one point in time, thereby ensuring design data integrity.

While the present invention has been described in terms of the above illustrated embodiments, those skilled in the art will recognize that the invention is not limited to the embodiments described. The present invention may be practiced with modification and alteration within the spirit and scope of the appended claims. The description is thus to be regarded as illustrative instead of restrictive on the present invention.

Thus, an access facilitator for facilitating remote client access to a CAD tool server has been described.

What is claimed is:

1. A method for remotely accessing computer-aided design (CAD) tools, the method comprising the steps of:
    a) accepting an access connection from a client at an access agent;
    b) obtaining an internetworking address of the client by the access agent;
    c) receiving an access request from the client at the access agent; and
    d) routing the access request along with the client's internetworking address from the access agent to a CAD tool, wherein the CAD tool responds directly to the client bypassing the access agent.

2. The method as set forth in claim 1, wherein step (c) comprises monitoring the access connection for access requests.

3. The method as set forth in claim 1, wherein the access request of step (c) results in design data being sent directly to the requesting client bypassing the access agent, as well as either new design data being created or existing design data being modified at the CAD tool; and step (d) is performed in a read/write synchronized manner to ensure design data integrity.

4. The method as set forth in claim 1, wherein the method further comprises the steps of:
    (e) accepting a preparatory connection by the client to the access agent; and
    (f) providing the client with an access connect applet from the access agent for establishing the access connection with the access agent, and receiving design data from the CAD tool.

5. The method as set forth in claim 1, wherein the method further comprises step (e) setting up a display environment of the client by the access agent to enable access request prompting and to accept direct responses from the CAD tool.

6. The method as set forth in claim 1, wherein the method further comprises the step of (e) servicing the client's request at the CAD tool, wherein the CAD tool responds directly to the client using the internetworking address.

7. A method for remotely accessing computer-aided design (CAD) tools, the method comprising the steps of:
    a) monitoring for access requests from remote clients by an access agent; and
    b) routing a detected access request of a remote client alone with ascertained location information of the remote client from the access agent to a CAD tool for execution, in a read/write synchronized manner to ensure design data integrity, wherein the CAD tool responds directly to the remote client, bypassing the access agent.

8. An apparatus comprising
    (a) a storage medium having stored therein a plurality of programming instructions which, when executed by the apparatus, are operative to implement an access service facilitating remote access to computer-aided design (CAD) tools, the access service including services for accepting an access connection from a client, obtaining an internetworking address of the client, receiving an access request from the client for a CAD tool, and routing the access request along with the internetworking address of the client to the CAD tool, wherein the CAD tool responds directly to the client bypassing the access service; and
    (b) an execution unit coupled to the storage medium for executing the plurality of programming instructions.

9. The apparatus as set forth in claim 8, wherein the access service further includes a monitor service for monitoring the access connection for access requests from the client.

10. The apparatus as set forth in claim 8, wherein the access service routes access requests to CAD tools in a read/write synchronized manner.

11. The apparatus as set forth in claim 8, wherein the programming instructions further implement a hypertext transfer protocol (http) server for accepting a preparatory connection to the access service, and providing the client with an access connect applet for establishing the access connection with the access service.

12. An apparatus comprising:
   (a) a storage medium having stored therein a plurality of programming instructions which, when executed, are operative to implement an access service facilitating remote access to computer-aided design (CAD) tools, the access service including a monitor service for monitoring access requests of remote clients to CAD tools, and a routing service for routing a detected access request of a remote client, along with ascertained location information of the remote client, from the access service to the CAD tool for execution, in a read/write synchronized manner to ensure design data integrity, wherein the CAD tool responds directly to the remote client, bypassing the access service; and
   (b) an execution unit coupled to the storage medium for executing the plurality of programming instructions.

13. A machine readable storage medium having stored therein a plurality of programming instructions which, when executed, are operative to implement an access service facilitating remote access of requesting clients to computer-aided design (CAD) tools, the access service including services for accepting an access connection from a client, obtaining an internetworking address of the client, receiving an access request to a CAD tool from the client, and routing the access request alone with the internetworking address from the access service to the CAD tool, wherein the CAD tool responds directly to the client bypassing the access service.

14. The storage medium as set forth in claim 13, wherein the access service includes a monitor service for monitoring the access connection for access requests from the client.

15. The storage medium as set forth in claim 13, wherein the access service routes access requests to CAD tools in a read/write synchronized manner.

16. The storage medium set forth in claim 13, wherein the programming instructions further implement a hyprtext transfer protocol (http) server to accepting a preparatory connection ot an access server hosting the access service, and providing the client with an access connect applet establishing the access connection to the access server.

17. A machine readable storage medium having stored therein a plurality of programming instructions which, when executed, are operative to implement an access service facilitating remote client accesses to computer-aided design (CAD) tools, the access service including a monitor service for monitoring access requests by remote clients, and a routing service for routing a detected access request of a remote client, along with ascertained location informationof the remote client, from the access service to a CAD tool for execution, in a read/write synchronized manner to ensure design data integrity, wherein the CAD tool responds directly to the remote client, bypassig the access agent.

* * * * *